US010915299B2

(12) United States Patent
Jemiolo et al.

(10) Patent No.: US 10,915,299 B2
(45) Date of Patent: Feb. 9, 2021

(54) AUTOMATICALLY MATCHING START CRITERIA AND COMPLETION CRITERIA OF A WALKTHROUGH FOR AN APPLICATION OR ONLINE SERVICE

(71) Applicant: salesforce.com, inc., San Francisco, CA (US)

(72) Inventors: Daniel Everett Jemiolo, Cary, NC (US); Jason Wagner, Raleigh, NC (US); Michael Burr, Cary, NC (US)

(73) Assignee: salesforce.com, inc., San Francisco, CA (US)

( * ) Notice: Subject to any disclaimer, the term of this patent is extended or adjusted under 35 U.S.C. 154(b) by 985 days.

(21) Appl. No.: 14/885,296

(22) Filed: Oct. 16, 2015

(65) Prior Publication Data

US 2017/0109393 A1 Apr. 20, 2017

(51) Int. Cl.
*G06F 8/20* (2018.01)
*G06F 9/445* (2018.01)
*G06F 8/36* (2018.01)
*G06F 16/954* (2019.01)

(52) U.S. Cl.
CPC .................. *G06F 8/20* (2013.01); *G06F 8/36* (2013.01); *G06F 9/44505* (2013.01); *G06F 16/954* (2019.01)

(58) Field of Classification Search
CPC .......... G06F 8/20; G06F 8/36; G06F 9/44505; G06F 9/5005; G06F 17/30873
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

U.S. Appl. No. 14/630,974, filed Feb. 25, 2015, Jemiolo et al.

(Continued)

*Primary Examiner* — Ashish Thomas
*Assistant Examiner* — Abdullah A Daud
(74) *Attorney, Agent, or Firm* — Weaver Austin Villeneuve & Samosen LLP

(57) ABSTRACT

Disclosed are examples of systems, apparatus, methods and computer program products for automatically matching start criteria and completion criteria of a walkthrough for an application or an online service. A database storing data objects identifying walkthroughs and walkthrough stages can be maintained. An indication can be received that walkthrough stages of a first walkthrough in the database have been added, removed, or modified. It can be determined that a first completion criterion associated with a first walkthrough stage of the first walkthrough and a first start criterion associated with a second walkthrough stage of the first walkthrough do not match. The first start criterion and the first completion criterion can be processed to generate a matched start criterion and a matched completion criterion. The first start criterion and the first completion criterion can be replaced with the matched start criterion and the matched completion criterion to generate a modified walkthrough.

17 Claims, 9 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,165,908 B2 * | 4/2012 | Bolle .................. G06T 7/0012 |
| | | 705/7.27 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,533,580 B1 * | 9/2013 | Xu ..................... G06F 16/957 |
| | | 715/205 |
| 8,566,301 B2 | 10/2013 | Rueben et al. |
| 8,646,103 B2 | 2/2014 | Jakobson et al. |
| 8,706,516 B2 * | 4/2014 | Warner .................. G06Q 50/22 |
| | | 705/2 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |

(56) References Cited

U.S. PATENT DOCUMENTS

| | | |
|---|---|---|
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0074735 A1* | 4/2006 | Shukla ............. G06F 8/34 705/80 |
| 2007/0245300 A1* | 10/2007 | Chan ............. G06Q 10/06 717/105 |
| 2008/0249972 A1 | 10/2008 | Dillon |
| 2009/0063415 A1 | 3/2009 | Chatfield et al. |
| 2009/0089652 A1* | 4/2009 | Chi ............. G06F 16/954 715/205 |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0315276 A1* | 11/2013 | Segal ............. G01K 7/22 374/1 |
| 2014/0258262 A1* | 9/2014 | Balz ............. G06F 3/0481 707/709 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0012382 A1* | 1/2015 | Ceribelli ............. G06Q 30/0609 705/26.35 |
| 2015/0095162 A1 | 4/2015 | Jakobson et al. |
| 2015/0142498 A1* | 5/2015 | Remacle ............. G06Q 10/0633 705/7.23 |
| 2015/0142596 A1 | 5/2015 | Jakobson et al. |
| 2015/0172563 A1 | 6/2015 | Jakobson et al. |
| 2015/0178062 A1* | 6/2015 | Adderly ............. G06F 8/65 717/170 |
| 2015/0220312 A1 | 8/2015 | Jemiolo |
| 2015/0278029 A1 | 10/2015 | Jemiolo |
| 2016/0182487 A1* | 6/2016 | Zhu ............. H04L 63/105 726/9 |
| 2016/0246467 A1* | 8/2016 | Jemiolo ............. G06Q 10/0633 |
| 2016/0246615 A1 | 8/2016 | Jemiolo et al. |
| 2016/0358130 A1* | 12/2016 | Capurro ............. G06Q 10/06316 |
| 2017/0046135 A1* | 2/2017 | Hazarika ............. G06F 9/541 |
| 2017/0139656 A1* | 5/2017 | Sterling ............. G06F 9/453 |
| 2017/0154189 A1* | 6/2017 | Betzler ............. G06F 9/45558 |
| 2019/0095968 A1* | 3/2019 | Ceribelli ............. G06Q 30/0609 |

OTHER PUBLICATIONS

U.S. Appl. No. 14/630,976, filed Feb. 25, 2015, Jemiolo et al.
"Google Plus Users", Google+Ripples, Oct. 31, 2011 [retrieved on Feb. 21, 2012 from Internet at http://www.googleplusers.com/google-ripples.html], 3 pages.

\* cited by examiner

US 10,915,299 B2

AUTOMATICALLY MATCHING START CRITERIA AND COMPLETION CRITERIA OF A WALKTHROUGH FOR AN APPLICATION OR ONLINE SERVICE

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to walkthroughs for applications or online services. More specifically, this patent document discloses techniques for automatically matching start criteria and completion criteria of a walkthrough for an application or an online service.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for automatically matching start criteria and completion criteria of a walkthrough for an application or an online service. These drawings in no way limit any changes in form and detail that may be made by one skilled in the art without departing from the spirit and scope of the disclosed implementations.

DETAILED DESCRIPTION

Figure 1:
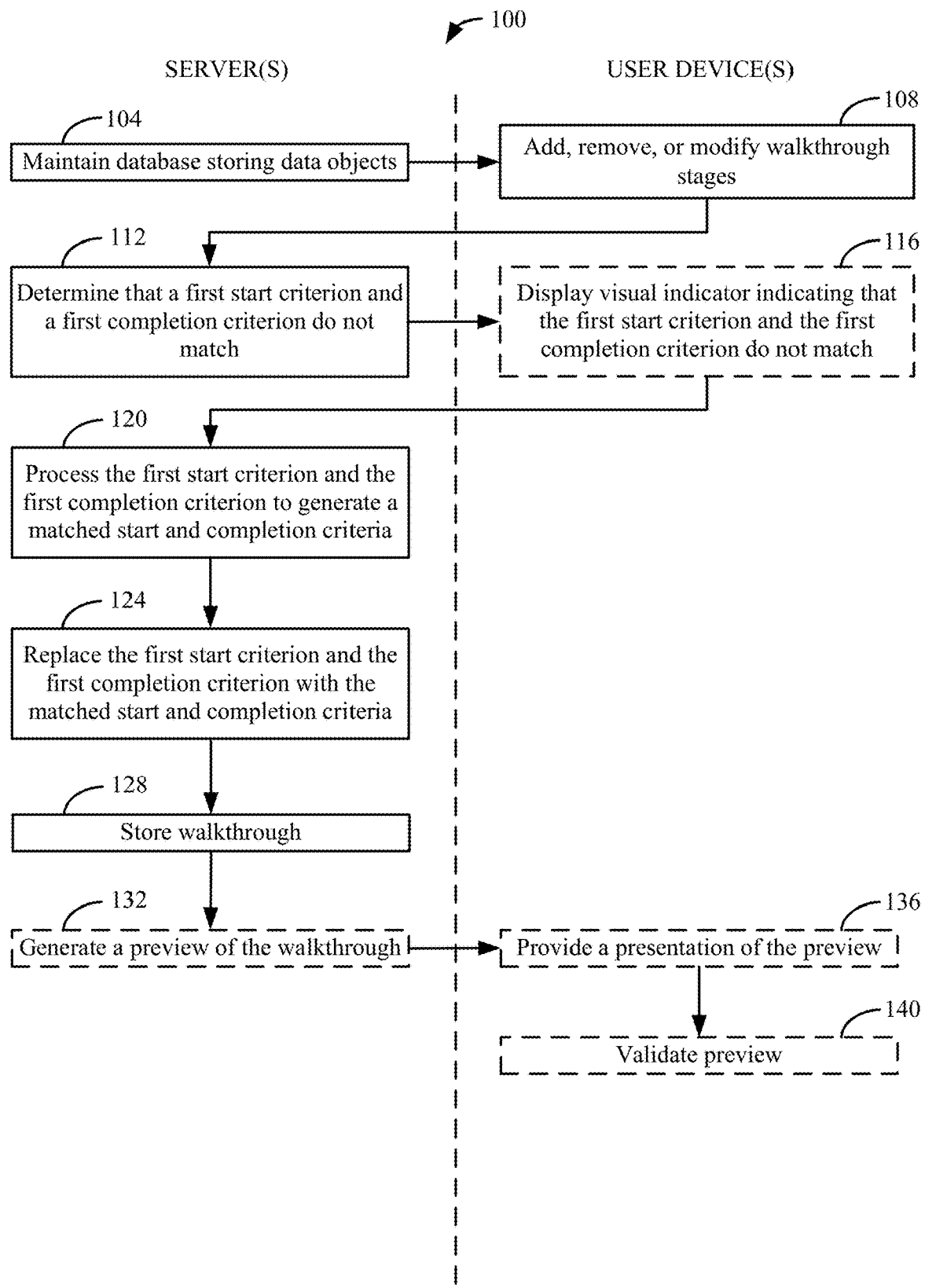
FIG. 1 shows a flowchart of an example of a method 100 for automatically matching start criteria and completion criteria of a walkthrough for an application or an online service, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for automatically matching start criteria and completion criteria of a walkthrough for an application or an online service. The concept of walkthroughs as discussed herein encompasses a range of subject matter. A walkthrough generally refers to an interactive presentation for training a user to use any computing application or online service such as, but not limited to, a cloud-based enterprise application. A walkthrough can include a variety of segments or portions, referred to herein as walkthrough stages. As described below, a walkthrough stage can be defined by start criteria, which specify conditions under which the walkthrough stage is configured to start, and completion criteria, which specify conditions under which the walkthrough stage is configured to be completed. In some implementations, a walkthrough can be provided using a server-based database system to deliver hands-on training to employees, customers, or other individuals at their computing devices. By way of illustration, such hands-on training can merge interactive e-learning tutorials with guided exercises within the same training application.

Adding, modifying, or deleting stages from conventional walkthroughs can be difficult. By way of illustration, Catherine is Chief Executive Officer (CEO) of Northanger Books, an online book retailer that is changing its business model from selling gothic novels to a niche audience to selling fiction to a much broader audience. As such, Catherine faces the challenge of modifying hundreds of Northanger Books' existing walkthroughs to fit the new business model. Unfortunately, removing or adding walkthrough stages can cause start and/or completion criteria to become mismatched. By way of example, Henry, head of software development at Northanger Books removes the second walkthrough stage from a "book ordering" walkthrough, which is an existing Northanger Books walkthrough. The book ordering walkthrough has three stages demonstrating different pages of the Northanger Books website. The completion criterion of the first stage and the start criterion of the second stage are met when a user interacting with the walkthrough clicks a first button. The completion criterion of the second stage and the start criterion of the third stage are met when a user interacting with the walkthrough clicks a second button, which is located on a different page of the Northanger Books website than the first button. As a result of removing the second stage from the book ordering walkthrough, the start criterion of the third walkthrough stage does not match the completion criterion of the newly preceding first walkthrough stage. Therefore, removing the second walkthrough stage from the book ordering walkthrough harms the function of the book ordering walkthrough.

Some of the disclosed techniques can be used to allow walkthrough authors to quickly add or remove content from an existing walkthrough without harming the function of the walkthrough. Returning to the example of the preceding paragraph, when Henry removes the second stage from the walkthrough, a database system can automatically identify start and completion criteria that have become mismatched. As described below, the mismatched start and completion criteria can be processed and matched start and completion criteria can be automatically generated. The database system can cause the walkthrough to be modified by replacing the mismatched start and completion criteria with the matched start and completion criteria. The modified walkthrough can then be stored in a database, as described in further detail below. Since the disclosed techniques allow Henry to remove, modify, or add walkthrough stages in the middle of walkthroughs without needing to worry about creating mismatched start and completion criteria, Henry can quickly, accurately, and effectively get Northanger Books' walkthroughs up to date with the new business model.

In some implementations, once start criteria and completion criteria of a walkthrough are automatically matched, a preview of the walkthrough can be presented to a user for validation by the user. By way of example, a preview of the walkthrough described in the preceding paragraph can be provided in a presentation on Henry's computing device. Henry can then validate the walkthrough to make sure that the matched start and completion criteria work properly. Henry can also supplement the walkthrough after viewing the preview. For example he can add text in several languages to make the walkthrough more accessible to international clients.

Figure 2:
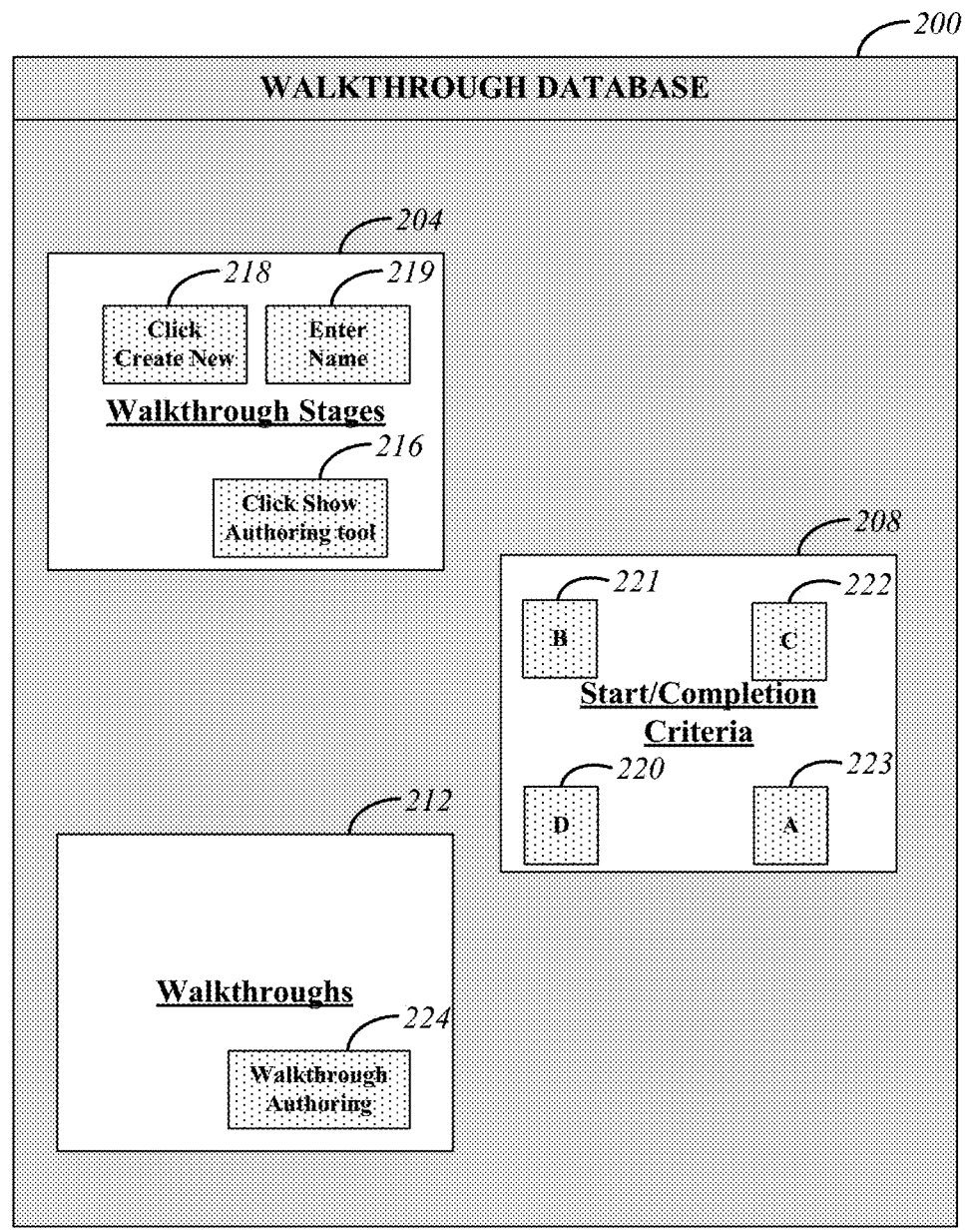
FIG. 2 shows a block diagram of an example of a Walkthrough Database 200, in accordance with some implementations.
Figure 3A:
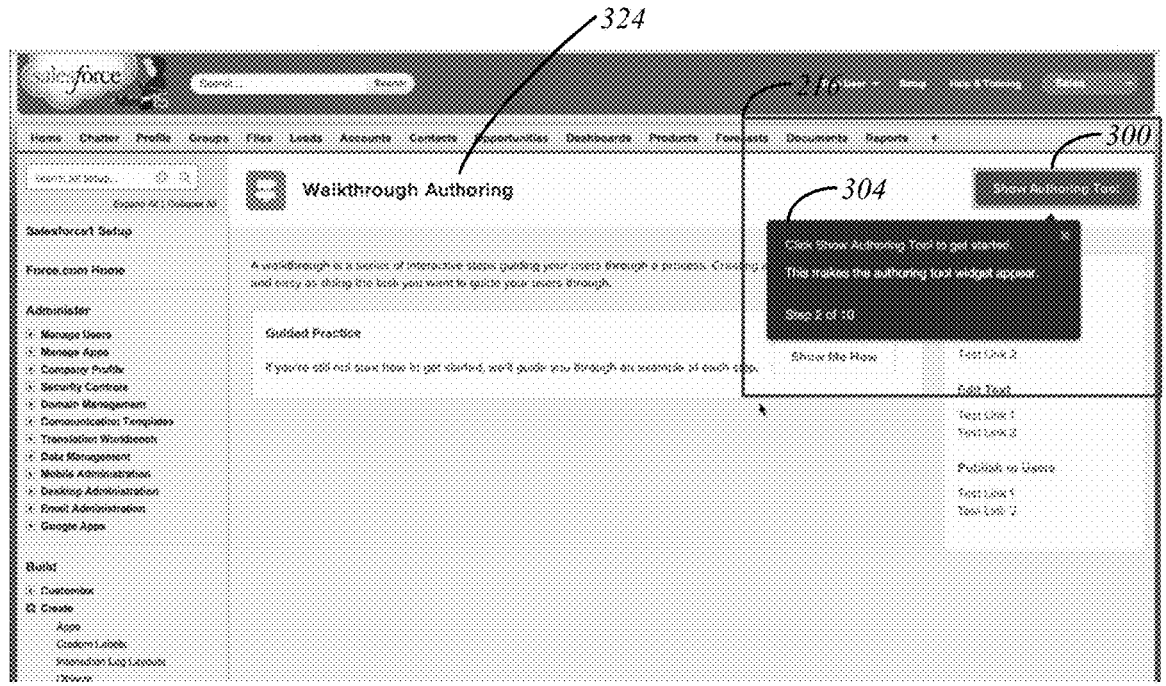
FIGS. 3A-C show examples of presentations of walkthrough stages in the form of graphical user interfaces (GUIs) as displayed on a computing device, in accordance with some implementations.
Figure 3B:
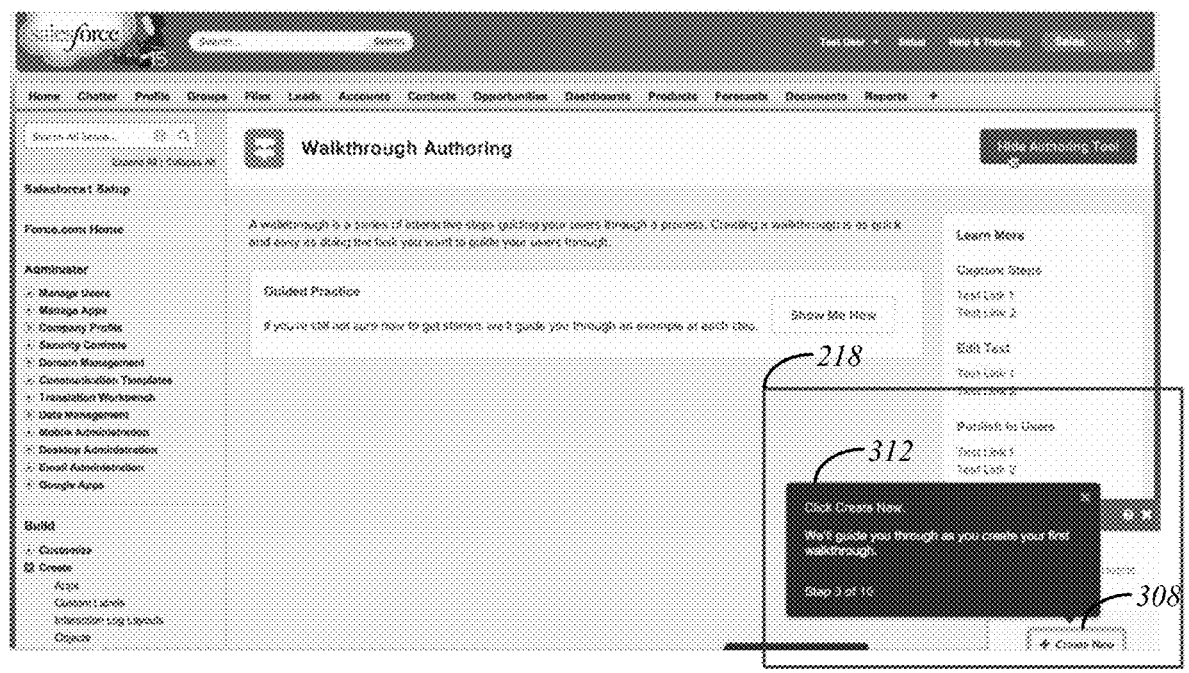
Figure 3C:
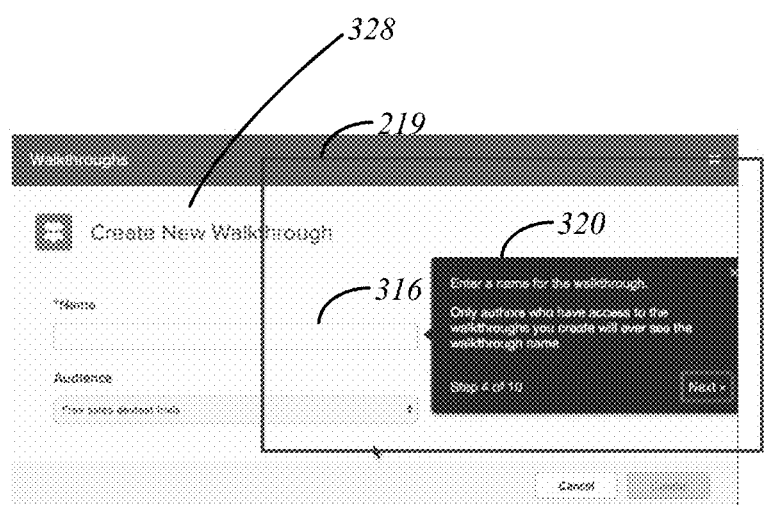
Figure 4A:
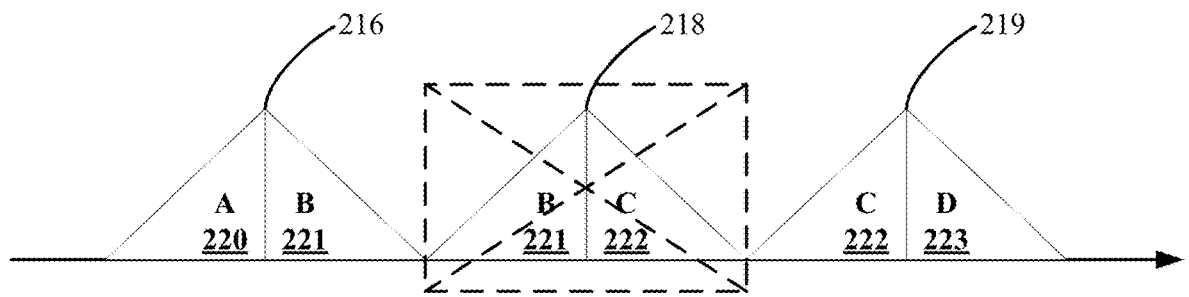
FIG. 4A shows an example of a simplified diagram of start and completion criteria of walkthrough stages, in accordance with some implementations.
Figure 4B:
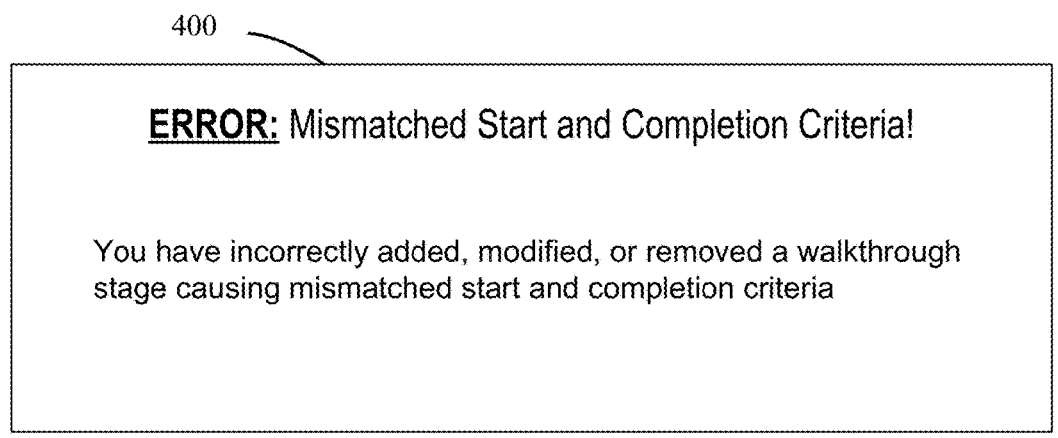
FIG. 4B shows an example of an error message 400, in accordance with some implementations.
Figure 4C:
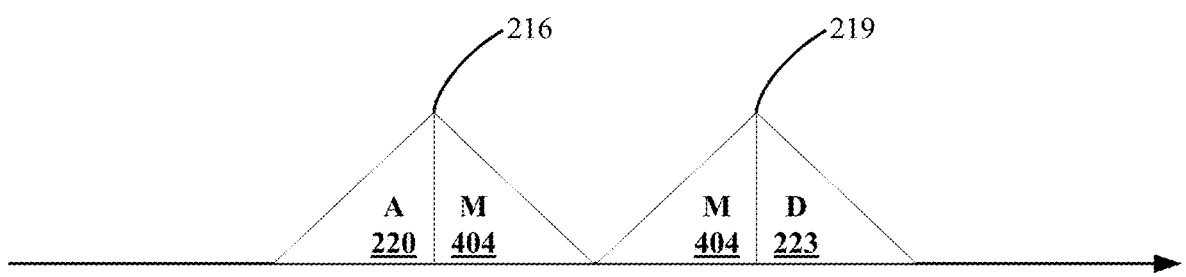
FIG. 4C shows an example of a simplified diagram of start and completion criteria of walkthrough stages, in accordance with some implementations.

FIG. 1 shows a flowchart of an example of a method 100 for automatically matching start criteria and completion criteria of a walkthrough for an application or an online service, performed in accordance with some implementations. FIG. 2 shows a block diagram of an example of a Walkthrough Database 200, in accordance with some implementations. FIGS. 3A-C show examples of presentations of walkthrough stages in the form of graphical user interfaces (GUIs) as displayed on a computing device, in accordance with some implementations. FIG. 4A shows an example of a simplified diagram of start and completion criteria of walkthrough stages, in accordance with some implementations. FIG. 4B shows an example of an error message 400, in accordance with some implementations. FIG. 4C shows an example of a simplified diagram of start and completion criteria of walkthrough stages, in accordance with some implementations.

At 104 of FIG. 1, Walkthrough Database 200 of FIG. 2 is maintained. Walkthrough Database 200 can be maintained by servers on behalf of an organization such as Northanger Books, by a third party such as salesforce.com, inc., or both. For example, Walkthrough Database 200 can form part of a database system 16 of FIGS. 5A and 5B. In some cases, walkthrough data can be stored in tenant data storage 22, described in greater detail below. Walkthrough Database 200 can store a wide variety of customizable data objects. For example, in FIG. 2, some data objects in Walkthrough Database 200 might identify walkthrough stages 204. Walkthrough stages 204, which, as described above, are segments or portions of a walkthrough, can contain both pre-defined walkthrough stages and user-defined walkthrough stages. Specific types of walkthrough stages can vary across implementations. For instance, Click Show Authoring Tool 216 is an example of a walkthrough stage that demonstrates how and when to click or tap Show Authoring Tool Button 300 of FIG. 3A as part of the Walkthrough Authoring 224 walkthrough, as described in more detail below. Along the same lines Enter Name 216 is an example of a walkthrough stage that demonstrates how and when to enter a name for a walkthrough into name field 316 of FIG. 3C as part of the Walkthrough Authoring 224 walkthrough, as described in more detail below. Click Create New 218, which demonstrates how and when to click or tap Create New Button 308 of FIG. 3B as part of the Walkthrough Authoring 224 walkthrough is another example of a walkthrough stage 204 stored in Walkthrough Database 200.

A walkthrough stage can be defined by a variety of data, such as a target, a label, start and/or completion criteria, etc., which can be stored in Walkthrough Database 200. By way of illustration, Click Show Authoring Tool 216 targets Show Authoring Tool Button 300 of FIG. 3. Additionally, Click Show Authoring Tool 216 is labeled by text box 304. Also or alternatively, a walkthrough stage can be defined by start criteria, which specify the conditions under which a walkthrough stage is displayed, and completion criteria, which specify when the stage is not displayed. By way of illustration, Click Show Authoring Tool 216 is the second walkthrough stage in the Walkthrough Authoring 224 walkthrough; therefore, start criterion A 220 for Click Show Authoring Tool 216 is met when the preceding stage in the Walkthrough Authoring 224 walkthrough is completed. Completion criterion B 221 of FIG. 2 for Click Show Authoring Tool 216 can be met when its target, Show Authoring Tool Button 304 of FIG. 3, is clicked or tapped by a user.

Along the same lines, the walkthrough stage Click Create New 218, targets Create New Button 308 of FIG. 3 and is labeled by text box 312. Since Click Create New 218 is immediately preceded by Click Show Authoring Tool 216 in Walkthrough Authoring 224, the completion criterion B 221 of FIG. 2 for Click Show Authoring Tool 216 is also the start criterion B 221 for Click Create New 218. In other words, Click Create New 218 begins when Click Show Authoring Tool 216 is completed. The completion criterion C 222 for Click Create New 218 can be met when Create New Button 308 of FIG. 3 is clicked or tapped by a user.

Similarly, the walkthrough stage Enter Name 219, targets Name Field 316 of FIG. 3 and is labeled by text box 320. Since Enter Name 219 is immediately preceded by Click Create New 218 in Walkthrough Authoring 224, the completion criterion C 222 of FIG. 2 for Click Create New 218 is also the start criterion C 222 for Enter Name 219. In other words, Enter Name 219 begins when Click Create New 218 is completed. Completion Criterion D 223 for Enter Name 219 can be met when a user enters text in Name Field 316 of FIG. 3.

Returning to FIG. 2, some data objects in Walkthrough Database 200 can identify Start/Completion Criteria 208, such as Start/Completion Criteria A-D 220-223, described above. Such Start/Completion Criteria 208 can vary across implementations and are described in further detail below. For example, some start or completion criteria can be met when a user clicks a button, enters text in a field, moves a mouse cursor over a feature of an application or service, selects a menu item, etc.

In some implementations, some data objects in Walkthrough Database 200 might also identify walkthroughs 212 such as Walkthrough Authoring 224. Walkthrough Authoring 224 is a walkthrough demonstrating how to author walkthroughs. Also or alternatively, a walkthrough might demonstrate features relating to Customer Relationship Management (CRM) records, such as an account, a task, a lead, a contact, a contract or an opportunity, or another type of data object.

Returning to FIG. 1, at 108, an indication that the walkthrough stage Click Show Authoring Tool 216 of FIG. 2 has been removed from Walkthrough Authoring 224 can be received at a server of a database system. For example, Henry may edit Walkthrough Authoring 224 on his computing device to remove Click Show Authoring Tool 216. In response to removing Click Show Authoring Tool 216, Henry's computing device can transmit data over the internet to a server of a database system. Such data can indicate that Henry has removed Click Show Authoring Tool 216 from Walkthrough Authoring 224.

Also or alternatively, at 108 of FIG. 1, an indication that a walkthrough stage has been added can be received at a server of a database system. By way of example, Henry may add one (or several) new stage to Walkthrough Authoring 224 of FIG. 2 using his computing device. Data indicating the addition of the new stage of can be transmitted from Henry's computing device to a server of a database system, as described above.

Also or alternatively, at 108, an indication that a walkthrough stage has been modified can be received. By way of illustration, Henry may modify the Click Show Authoring Tool 216 stage of Walkthrough Authoring 224 using his computing device. Data indicating the modification of Authoring Tool 216 can be transmitted from Henry's computing device to a server of a database system, as described above.

At 112 or FIG. 1, it is determined, in response to the indication received at 108, that start criterion C 222 of FIG. 4A for walkthrough stage Enter Name 219 of FIG. 2 does not match completion criterion B 221 of walkthrough stage Click Show Authoring Tool 216. For example, in response to a walkthrough stage being added, modified, or removed, a database system can compare the start and completion criteria of walkthrough stages immediately preceding and immediately following the added, modified or removed stage. By way of illustration, Click Show Authoring Tool 216 immediately precedes Enter Name 220 because Click Create New 218, the stage that was between Click Show Authoring Tool 216 and Enter Name 220, has been removed. A database system can compare completion criterion B 221 for Click Show Authoring Tool 216 to start criterion C 222 for Enter Name 219 and determine that completion criterion B 221 and start criterion C 222 do not match.

Alternatively, at 112, it can be determined that mismatched start and completion criteria are not created when a walkthrough stage is added, removed, or modified. By way of example, Henry records a "form walkthrough" demonstrating how to fill out an order form in the Northanger Books platform. Henry deletes several walkthrough stages that do not relate to the order in which the form is filled out. Since the deleted walkthrough stages have no effect on any of the immediately following or immediately preceding walkthrough stages, mismatched start and completion criteria are not created.

Along the same lines, in some implementations, if a walkthrough stage at the end of a walkthrough is removed; mismatched start and completion criteria are not created. In other words, removing a final stage of a walkthrough does not impact the start and/or completion criteria of any remaining stages since there are no walkthrough stages after the final stage. As such, if it is determined that a user has removed a final stage from the end of a walkthrough, he or she can remove the final stage without restriction.

In some, but not all, implementations, at 116, error message 400 of FIG. 4B that indicates that start criterion C 222 and completion criterion B 221 of FIG. 4A do not match is displayed. For example, a database system can be configured to transmit data to Henry's computing device, causing error message 400 to be displayed on a display of Henry's computing device.

Also or alternatively, a variety of other visual or audial indicators can be caused to be displayed or played to notify a walkthrough author of mismatched start and completion criteria. Returning to the example of the preceding paragraph, Henry's computing device can emit a buzz/beep or display a red stop sign in conjunction with, or separately from, error message 400.

Returning to FIG. 1, at 120, start criterion C 222 and completion criterion B 221 of FIG. 4A are processed to generate matched start and completion criteria M 404 of FIG. 4C. The processing of mismatched start and completion criteria to generate matched start and completion criteria can vary across implementations.

In some implementations, when an added, removed, or modified walkthrough stage is targeted at various features of a page of a web application, source code for the page of the web application can be parsed and processed to generate matched start and completion criteria. For example, as described above, start criterion C 222 is met when a user interacting with page 324 of FIG. 3A clicks or taps Create New Button 308 to navigate to page 328 of FIG. 3C. As such, a database system can load the Uniform Resource Locator (URL) of page 328, parse the source code of page 324, and search the source code for links to the URL of page 328. A database system can identify such links by searching anchor tags, JavaScript click handlers, or form actions. By way of example, links can be identified using anchor tags by parsing the HyperText Markup Language (HTML) source code of page 324 and identifying a link in text following the anchor tag "<a href" in the source code. Matched start and completion criteria M 404 of FIG. 4C can be generated using the link. In other words, a database system can generate start and completion criterion M of FIG. 4C to be met when a user interacting with the Walkthrough Authoring 224 walkthrough clicks or taps a link on page 324 of FIG. 3A to navigate to page 328 of FIG. 3C.

In some implementations, if no links to the URL for page 328 of FIG. 3C can be identified in the source code of page 324 of FIG. 3A, start and completion criteria M 404 of FIG. 4C can be met based on user input in an address bar of an internet browser. By way of example, a database system can generate start and completion criteria M of FIG. 4C to be met when a user interacting with the Walkthrough Authoring 224 walkthrough of FIG. 2 enters the URL of page 328 of FIG. 3C in the address bar of his or her internet browser.

In some implementations, matched start and completion criteria can be generated based on customizable user preferences. Returning to the example of the preceding paragraph, there may be multiple ways in which a link can be reached such as by clicking a button, a hyperlink, speaking into a microphone of a computing device, navigating directly using an address bar, etc. As such, there may be multiple ways in which matched start and completion criteria may be generated. By way of illustration, Henry's preferences indicate that he prefers buttons over hyperlinks. Accordingly, matched start and completion criteria for Henry will be generated using buttons rather than hyperlinks because due to Henry's preferences.

Also or alternatively, when a number of walkthrough stages are removed from a walkthrough, start and completion criteria may become mismatched because the presence of a certain feature, such as a button or a field, defines the start criterion for the walkthrough stage immediately following the removed stages. In this instance, a page of the application or service containing the feature can be made present. By way of illustration, a database system can load each removed stage (going backwards) until the database system identifies a stage that causes the feature to be present. In many cases, the final removed stage causes visibility of the feature. As such, matched start and completion criteria can be generated using the final removed stage to cause a feature of an application or service to be visible.

In some implementations, if matched start and completion criteria cannot be automatically generated, a walkthrough author can be notified of mismatched start and completion criteria by way of an error message such as error message 400 or FIG. 4B. The author can be prompted to manually generate matched start and completion criteria.

Returning to FIG. 1, at 124, start criterion C 222 and completion criterion B 221 of FIG. 4A are replaced with matched start and completion criteria M 404 of FIG. 4C. At 128 of FIG. 1, the modified walkthrough is stored in Walkthrough Database 200 of FIG. 2. The modified walkthrough can then be accessed via a data network, such as the internet, and interacted with by users of Walkthrough Database 200, such as Henry, by using a computing device.

In some but not all implementations, at 132, a preview of the walkthrough is generated and at 136 a presentation of the preview is provided. The preview can to be accessed via a data network such as the internet and interacted with by a user. By way of example, after the walkthrough is generated, Henry might click or tap a button in the user interface of his iPad® requesting to view the preview. The walkthrough database system can provide data to Henry's iPad® which can be processed by a processor of the iPad® to display a presentation of the preview. Henry can then interact with the preview to validate or modify the walkthrough, as described further below.

In some implementations, at 140, a user might view a presentation of a preview and decide to modify or validate a walkthrough. By way of illustration, if Henry views a preview and notices that some text in the preview is inaccurate, he can request to modify the walkthrough by editing the inaccurate text. The walkthrough can then be modified according to Henry's request and the modified walkthrough can be stored in Walkthrough Database 200.

Some of the disclosed techniques can be used to automatically update a new version of a walkthrough when a version of an application or service is updated. By way of illustration, features of the Northanger Books platform may be added, removed or modified. As such, start and completion criteria of some stages of existing walkthroughs for the Northanger Books platform may no longer match. Thus, such walkthroughs can be automatically updated such that start criteria and completion criteria of sequential walkthrough stages match, as described above in the context of 112-128 of FIG. 1.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
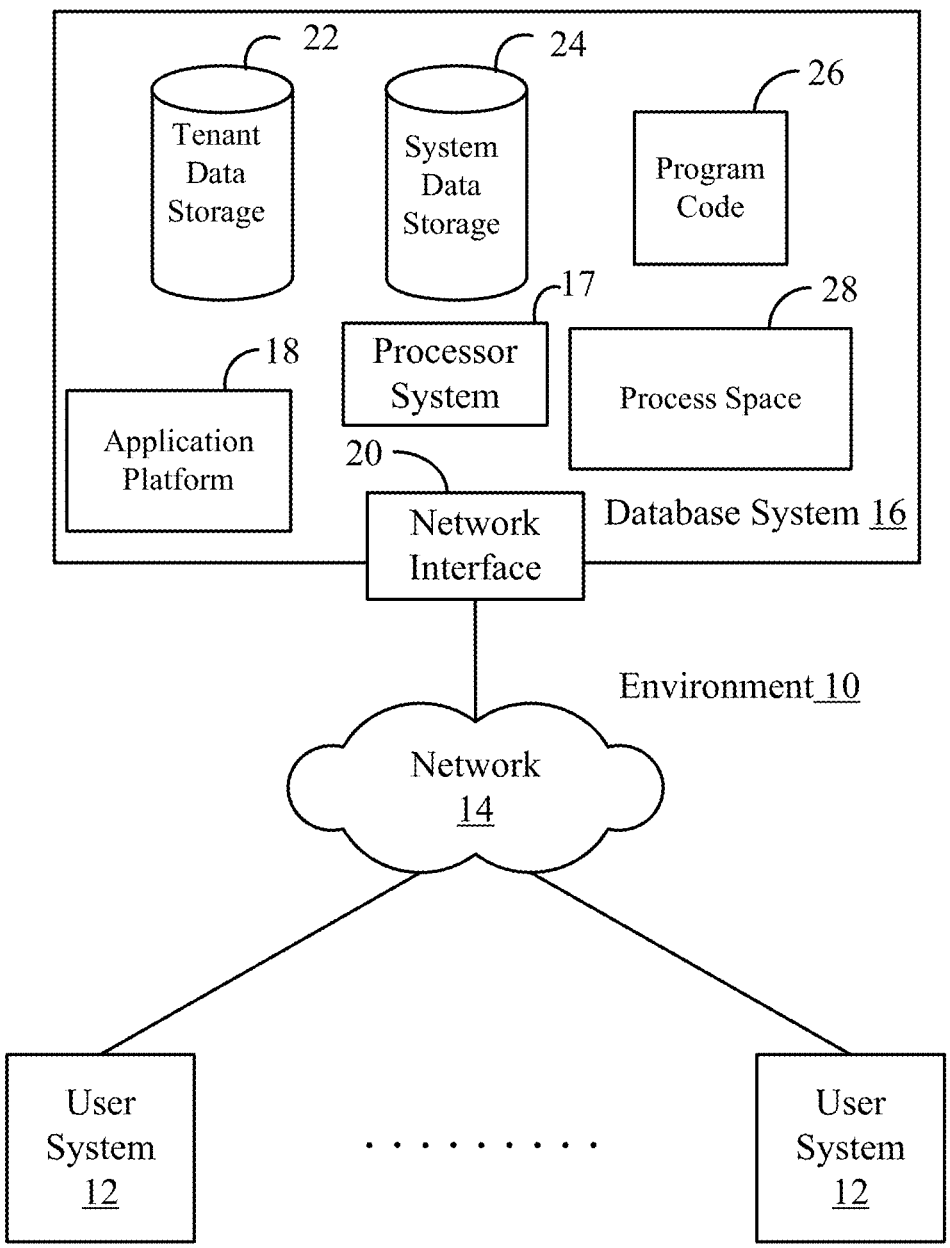
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
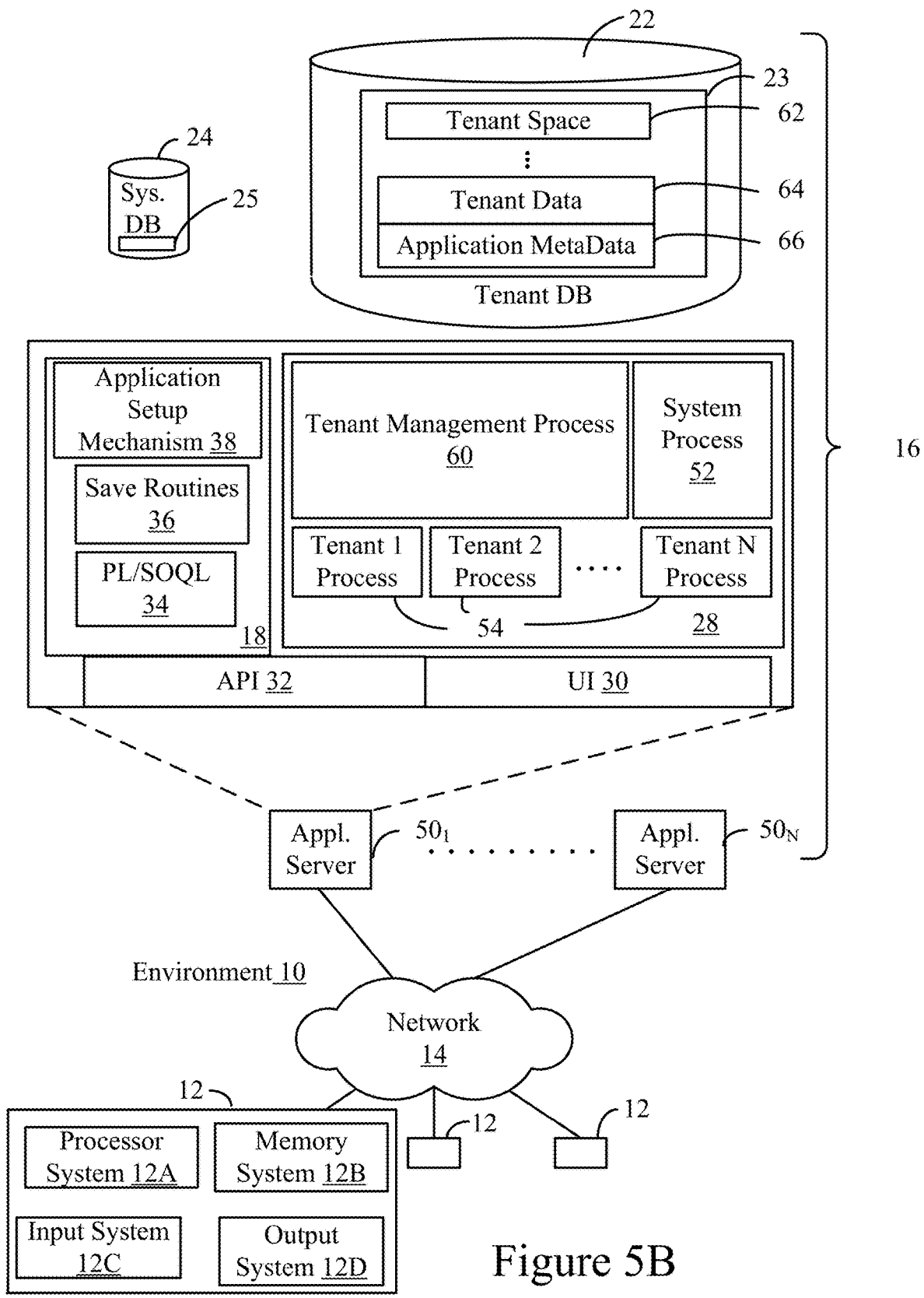
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
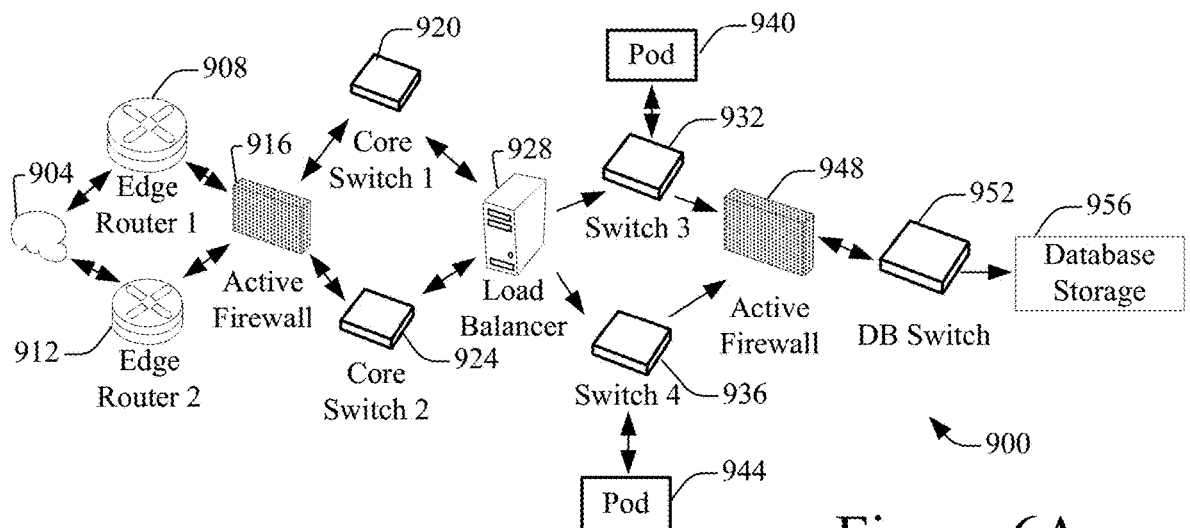
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
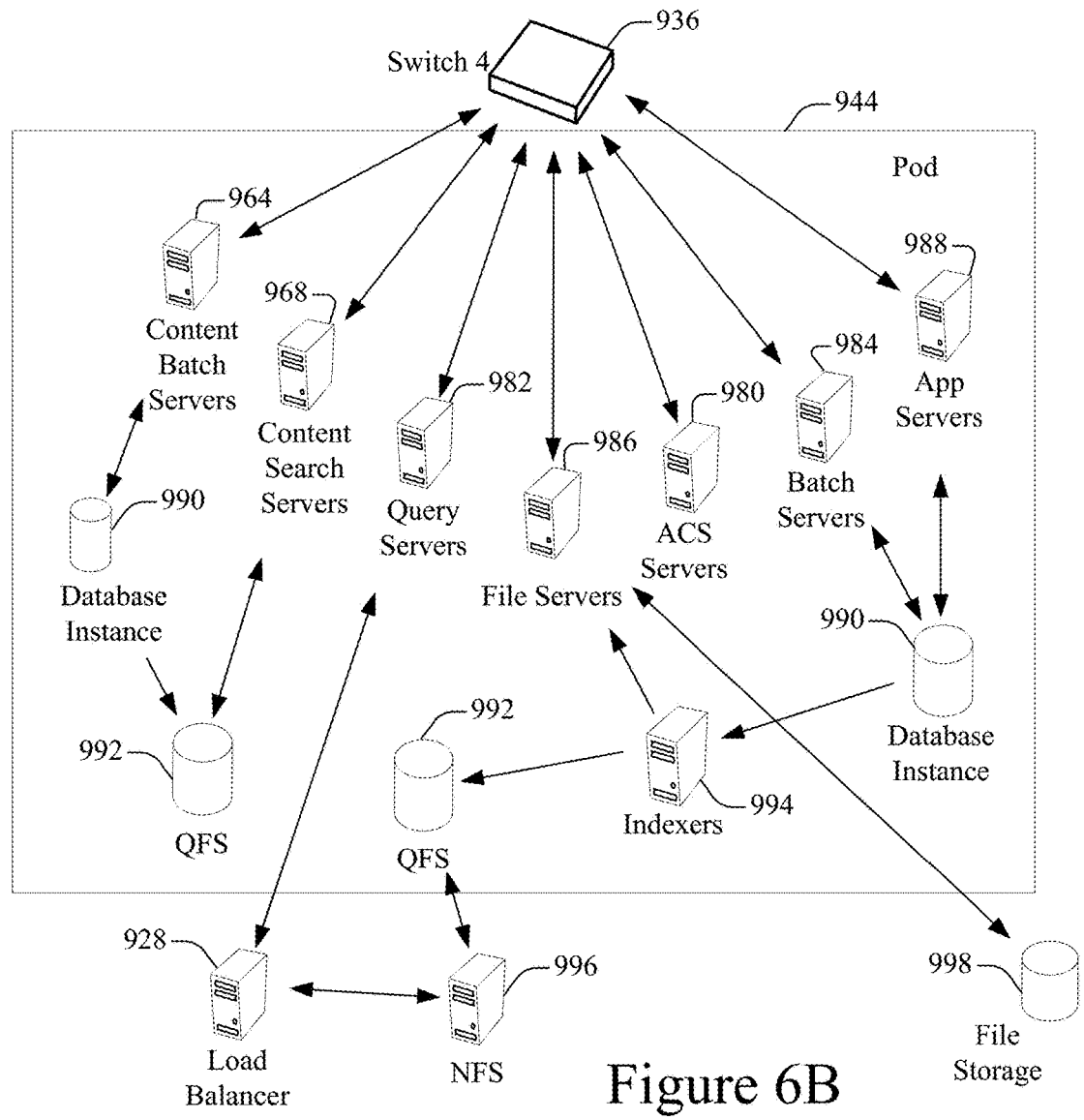
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4C. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM")

devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database storing data objects identifying walkthroughs and walkthrough stages, each walkthrough comprising a plurality of sequentially ordered walkthrough stages to define a respective interactive training presentation displayable in a user interface on a display device for training a user, each walkthrough stage having an associated start criterion specifying one or more conditions under which the associated walkthrough stage is configured to start and each walkthrough stage having an associated completion criterion specifying one or more conditions under which the associated walkthrough stage is configured to be completed; and
one or more servers in communication with the database, the one or more servers comprising one or more processors operable to cause:
automatically determining, in response to receiving an indication that one or more walkthrough stages of a first walkthrough has been added, removed, or modified, that a first completion criterion associated with a first walkthrough stage of the first walkthrough and a first start criterion associated with a second walkthrough stage of the first walkthrough do not match, the first walkthrough stage preceding the second walkthrough stage;
automatically generating, responsive to determining that the first start criterion and the first completion criterion do not match, a matched start criterion and a matched completion criterion, the matched start criterion and the matched completion criterion being automatically generated without user input by at least:
identifying a network address of a second web page configured to display the second walkthrough stage, and
processing source code of a first web page configured to display the first walkthrough stage to identify in the source code one or more links to the network address of the second web page, the one or more links being identified in one or more of:
an anchor tag, a JavaScript click handler, a form action, or a navigation map of the source code of the first web page;
automatically replacing the first start criterion with the matched start criterion and replacing the first completion criterion with the matched completion criterion to generate a modified walkthrough;
providing, responsive to generating the modified walkthrough, a preview of the modified walkthrough, the preview configured to be interacted with using a client device for validation and/or modification of the modified walkthrough; and
storing the modified walkthrough as a data file in the database.

2. The system of claim 1, the one or more processors further operable to cause:
determining that a version of the first walkthrough has been updated;
identifying, responsive to determining that the version of the first walkthrough has been updated, a plurality of mismatched start and completion criteria; and
replacing the plurality of mismatched start and completion criteria with a plurality of matched start and completion criteria.

3. The system of claim 1, the one or more processors further operable to cause:
displaying a visual indicator on a display of a computing device, the visual indicator indicating that the first start criterion and the first completion criterion do not match.

4. The system of claim 1, the one or more processors further operable to cause:
providing, to the client device, data capable of being processed by a processor of the client device to display a presentation of the preview.

5. The system of claim 1, wherein the first start criterion and the first completion criterion are processed to generate the matched start criterion and the matched completion criterion based on a preference list.

6. The system of claim 1, the one or more processors further operable to cause:
determining, in response to receiving a further indication that one or more further stages of the first walkthrough has been added, removed, or modified, that a second completion criterion associated with a third walkthrough stage of the first walkthrough and a second start criterion associated with a fourth walkthrough stage of the first walkthrough match, the third walkthrough stage preceding the fourth walkthrough stage; and
adding, removing, or modifying, responsive to determining that the second completion criterion and the second start criterion match, the one or more further stages with respect to the first walkthrough.

7. The system of claim 1, the one or more processors further operable to cause:
determining, in response to receiving a further indication that one or more further stages of the first walkthrough has been removed, that the one or more further stages are one or more final stages of the first walkthrough; and
removing, responsive to determining that the one or more further stages are one or more final stages, the one or more further stages from the first walkthrough.

8. A method comprising:
providing, by one or more servers associated with a database system, access to a database storing data objects identifying walkthroughs and walkthrough stages, each walkthrough comprising a plurality of sequentially ordered walkthrough stages to define a respective interactive training presentation displayable in a user interface on a display device for training a user, each walkthrough stage having an associated start criterion specifying one or more conditions under which the associated walkthrough stage is configured to start and each walkthrough stage having an associated completion criterion specifying one or more conditions under which the associated walkthrough stage is configured to be completed;

receiving an indication that one or more walkthrough stages of a first walkthrough has been added, removed, or modified;

automatically determining, in response to receiving the indication that the one or more walkthrough stages of the first walkthrough has been added, removed, or modified, that a first completion criterion associated with a first walkthrough stage of the first walkthrough and a first start criterion associated with a second walkthrough stage of the first walkthrough do not match, the first walkthrough stage preceding the second walkthrough stage;

automatically generating, responsive to determining that the first start criterion and the first completion criterion do not match, a matched start criterion and a matched completion criterion, the matched start criterion and the matched completion criterion being automatically generated without user input by at least:
- identifying a network address of a second web page configured to display the second walkthrough stage, and
- processing source code of a first web page configured to display the first walkthrough stage to identify in the source code one or more links to the network address of the second web page, the one or more links being identified in one or more of: an anchor tag, a JavaScript click handler, a form action, or a navigation map of the source code of the first web page;

automatically replacing the first start criterion with the matched start criterion and replacing the first completion criterion with the matched completion criterion to generate a modified walkthrough;

providing, responsive to generating the modified walkthrough, a preview of the modified walkthrough, the preview configured to be interacted with using a client device for validation and/or modification of the modified walkthrough; and storing the modified walkthrough as a data file in the database.

9. The method of claim 8, further comprising:
determining that a version of the first walkthrough has been updated;
identifying, responsive to determining that the version of the first walkthrough has been updated, a plurality of mismatched start and completion criteria; and
replacing the plurality of mismatched start and completion criteria with a plurality of matched start and completion criteria.

10. The method of claim 8, further comprising:
causing display of a visual indicator on a display of a computing device, the visual indicator indicating that the first start criterion and the first completion criterion do not match.

11. The method of claim 8, further comprising:
providing, to the client device, data capable of being processed by a processor of the client device to display a presentation of the preview.

12. The method of claim 8, wherein the first start criterion and the first completion criterion are processed to generate the matched start criterion and the matched completion criterion based on a preference list.

13. A computer program product comprising computer-readable program code to be executed by one or more processors when retrieved from a non-transitory computer-readable medium, the program code comprising instructions configured to cause:
providing, by one or more servers associated with a database system, access to a database storing data objects identifying walkthroughs and walkthrough stages, each walkthrough comprising a plurality of sequentially ordered walkthrough stages to define a respective interactive training presentation displayable in a user interface on a display device for training a user, each walkthrough stage having an associated start criterion specifying one or more conditions under which the associated walkthrough stage is configured to start and each walkthrough stage having an associated completion criterion specifying one or more conditions under which the associated walkthrough stage is configured to be completed;

automatically determining, in response to receiving an indication that one or more walkthrough stages of a first walkthrough has been added, removed, or modified, that a first completion criterion associated with a first walkthrough stage of the first walkthrough and a first start criterion associated with a second walkthrough stage of the first walkthrough do not match, the first walkthrough stage preceding the second walkthrough stage;

automatically generating, responsive to determining that the first start criterion and the first completion criterion do not match, a matched start criterion and a matched completion criterion, the matched start criterion and the matched completion criterion being automatically generated without user input by at least:
- identifying a network address of a second web page configured to display the second walkthrough stage, and
- processing source code of a first web page configured to display the first walkthrough stage to identify in the source code one or more links to the network address of the second web page, the one or more links being identified in one or more of: an anchor tag, a JavaScript click handler, a form action, or a navigation map of the source code of the first web page;

automatically replacing the first start criterion with the matched start criterion and replacing the first completion criterion with the matched completion criterion to generate a modified walkthrough;

providing, responsive to generating the modified walkthrough, a preview of the modified walkthrough, the preview configured to be interacted with using a client device for validation and/or modification of the modified walkthrough; and storing the modified walkthrough as a data file in the database.

14. The computer program product of claim 13, the instructions further configured to cause:
determining that a version of the first walkthrough has been updated;

identifying, responsive to determining that the version of the first walkthrough has been updated, a plurality of mismatched start and completion criteria; and replacing the plurality of mismatched start and completion criteria with a plurality of matched start and completion criteria.

15. The computer program product of claim 13, the instructions further configured to cause:

displaying a visual indicator on a display of a computing device, the visual indicator indicating that the first start criterion and the first completion criterion do not match.

16. The computer program product of claim 13, the instructions further configured to cause:

providing, to the client device, data capable of being processed by a processor of the client device to display a presentation of the preview.

17. The computer program product of claim 13, wherein the first start criterion and the first completion criterion are processed to generate the matched start criterion and the matched completion criterion based on a preference list.

\* \* \* \* \*